United States Patent [19]

Peterson

[11] Patent Number: 5,104,700
[45] Date of Patent: Apr. 14, 1992

[54] FIRE PROTECTIVE DEVICE

[76] Inventor: Roger L. Peterson, 2379 Edgewater Ter., Los Angeles, Calif. 90039

[21] Appl. No.: 881,576

[22] Filed: Jul. 2, 1986

Related U.S. Application Data

[63] Continuation of Ser. No. 598,402, Apr. 10, 1984, abandoned, which is a continuation of Ser. No. 138,769, Apr. 10, 1980, abandoned, which is a continuation of Ser. No. 741,040, Nov. 11, 1976, abandoned, which is a continuation-in-part of Ser. No. 707,592, Jul. 22, 1976, abandoned.

[51] Int. Cl.$^5$ .................. F16L 58/18; F16L 59/02; B65D 90/04
[52] U.S. Cl. .................. 428/34.5; 428/34.6; 428/34.7; 428/36.91; 428/98; 428/99; 428/101; 428/102; 428/218; 428/223; 428/247; 428/251; 428/252; 428/913; 428/92; 24/16 PB; 24/908; 24/97; 220/88.1; 220/450; 220/451; 220/452; 220/901; 220/902
[58] Field of Search .................. 428/35, 98, 99, 101, 428/102, 218, 223, 247, 251, 252, 913, 920, 34.5, 34.6, 34.7, 36.91; 24/16 PB, 90 B, 97, 14 A; 138/137, 149; 220/88 R, 450, 451, 452, 901, 902

[56] References Cited

U.S. PATENT DOCUMENTS

| | | | |
|---|---|---|---|
| 1,984,190 | 12/1934 | Huffine | 428/75 |
| 2,175,948 | 10/1939 | Adams | 428/121 |
| 2,238,550 | 4/1941 | Blake et al. | 24/90 B |
| 2,405,330 | 8/1946 | Ryder | 138/124 |
| 2,758,043 | 8/1956 | Cryor | 428/920 |
| 3,053,715 | 9/1962 | Labino | 138/149 |
| 3,187,778 | 6/1965 | Peyton et al. | 138/157 |
| 3,216,459 | 11/1965 | Schroeder et al. | 138/149 |
| 3,341,904 | 9/1967 | Joyner et al. | 24/90 B |
| 3,486,200 | 12/1969 | Orenick | 24/16 PB |
| 3,490,104 | 1/1970 | Kabel | 24/16 PB |
| 3,589,971 | 6/1971 | Reed | 428/920 |
| 3,591,400 | 7/1971 | Palaquist et al. | 428/920 |
| 3,780,400 | 12/1973 | Hinsperger | 24/16 PB |
| 3,810,491 | 5/1974 | Hildebrandt | 130/149 |
| 3,816,226 | 6/1974 | Finelli | 428/280 |
| 3,861,022 | 1/1975 | Hildebrant et al. | 138/149 |
| 3,905,855 | 9/1975 | Blewett et al. | 428/920 |
| 3,948,295 | 4/1976 | Lemont et al. | 130/149 |
| 3,972,093 | 8/1976 | Aimar | 24/90 B |

Primary Examiner—Cynthia Hamilton
Attorney, Agent, or Firm—Lyon & Lyon

[57] ABSTRACT

A fire protective insulating device adapted to be placed about articles to be protected from fire. The device comprises at least one layer of resilient and compressible insulative material having a plurality of compressive fastener means for mechanically compressing the insulative material to a high density, at least a portion of the fastening material being substantially less resistive to high temperature than the insulative material. A scrim means may be wrapped about the outside of the compressed insulative material for retaining the compressed insulative material. At least a portion of the scrim means is also preferably constructed of a material which is substantially less resistive to high temperature than is the insulative material. Upon contact with high temperature, the structural integrity of the fastening means is decreased allowing the compressed insulative material to mechanically expand. The insulating device may be performed in a boxlike or in a boot type configuration, one end of the insulating device being adapted to be opened in order to be positioned about a motor or other object to be protected from fire, said end being adapted to then be sealed in order to isolate the object to be protected from fire.

50 Claims, 4 Drawing Sheets

FIRE PROTECTIVE DEVICE

This application is a continuation of application Ser. No. 598,402, filed Apr. 10, 1984, abandoned, which application in turn is a continuation of U.S. patent application Ser. No. 138,769, filed Apr. 10, 1980, now abandoned, which application in turn is a continuation of U.S. patent application Ser. No. 741,040, filed Nov. 11, 1976, now abandoned, which application in turn is a continuation-in-part of U.S. patent application Ser. No. 707,592, filed Jul. 22, 1976, now abandoned.

BACKGROUND OF THE INVENTION

1. Field of the Invention

The present invention is directed to an improved protective insulating device adapted to be placed about an article to be protected from fire.

2. Description of the Prior Art

The need for means of fire proofing articles such as electrical conductors, conduits or pipes, and electrical motors so that they will withstand high temperature fires, having an open flame temperature as high as 1600° to 2000° F. for extended periods of time is desirable in a number of industrial applications. The petroleum industry, and particularly the refining portion of the petroleum industry, is one such industrial application where high temperature protection is desirable. Because of the extremely high flammability of products being produced, transferred and stored, protection against hydrocarbon fires which react such high temperatures referred to above for extended periods of time is essential. It is necessary that the piping and electrical systems which may be connected throughout an entire refinery or plant not ignite and thereby spread the fire throughout the entire installation. Electrical motors, pipes and cables must be made to withstand such high temperature fires for time periods on the order of fifteen to thirty minutes or more in order to provide adequate time to contain the fire. During this time period it is essential that the system remain functional in order to allow for an orderly operation or plant shutdown in order to isolate the unit wherein the fire is to be extinguished.

Typical non-flammable cable insulation such as polyvinyl chloride (PVC), neoprene or chlorinated polyethylene is unable to withstand such high temperature fires for extended periods of time. Typical electrical motor winding insulation is also unable to withstand such extreme open flame temperatures. As much of the hydrocarbon fluid is transported throughout a typical industrial plant by means of pumps which are powered by electric motors, it is mandatory that such motors be kept in operation in order to provide for continued plant operation or orderly shutdown. Further, many industrial plants employ electric motor operators which are utilized to perform various functions such as, for example, the opening and closing of valves in product lines. It is often of critical importance that electrically operated valves be closed in order to isolate an industrial fire; thus it is in turn of great importance that such motors be protected from damage and failure by the high temperatures produced by such fires. Further, hydraulically operated valves are also subject to being damaged by fire. When the insulation on the coil windings of electrical motors or electrical cables located within the plant are exposed to fire, the insulation decomposes and any chlorine present in the insulative compound is freed which combines with the humidity in the air or water, which has been used for extinguishing the fire, and forms hydrochloric acid which can penetrate concrete foundations and attack steel reinforcement.

The electrical wiring system for many industrial plants utilizes a cable tray into which a plurality of cables are placed. Such a tray increases the fire hazard over the alternate system of encasing the cables in metal conduits. Electrical junction boxes in such electrical wiring systems are another area in which a substantial fire hazard is present. In the electrical tray system, the cables are simply laid or suspended on trays throughout the plant. This system thus facilitates insulation repair of the cables since they do not have to be pulled through a conduit as in the alternative method. However, in the tray the fire hazard is increased because of the number of cables set adjacent each other as well as the possibility of combustible material being collected in the suspended trays.

Piping system in many chemical plants must be designed in order to handle corrosive and flammable fluids. Because of the corrosion resistance nature of piping fabricated from polyvinyl chloride, such piping has found wide application in the handling, pumping and storing of corrosive fluids. Where such piping is used in plants such as petroleum refineries or in the chemical industry to transport corrosive fluids, it is essential that the pipe be able to withstand high temperature flash fires and open flame temperatures of on the order of 1600° to 2000° F.

Simple and efficient means for protecting cables and pipes and electrical motors from high temperature fires for extended periods of time have not been completely successful. Where the cable or pipe or electrical motor is wrapped or coated and exposed to the harsh environment of the chemical plant and to outdoor weathering, asbestos wrappings and other coatings have been found to deteriorate and lose their fire protective ability. Glass fibers when used for such applications have generally demonstrated a higher strength and durability over their asbestos counterparts; however, since such glass fiber may sinter in the region of 1000° F., they are not suitable for the protection against high temperature flash fires which may occur for example, in a petroleum refining plant.

In order to provide protection for the various shapes of the articles to be protected from fire such as electrical motors, fire protective means have been provided which may be applied as a viscous liquid or semisolid mixture of a flame retardent material and a solvent, such mixtures being applied by means of a spraying or troweling. Such fire protective means become solid in a relatively short period of time as the solvent evaporates. While such fire protective means may be proficient at protecting an article from fire, they are unsatisfactory for such an application because this permanence prevents periodic maintenance and examination of the motor without extensive expense in removing and then reapplying such compounds.

Industrial and other fires typically spread at ground level with their flames reaching upward, thus greater fire protection is often required at the base or bottom of an article to be protected as contrasted with its sides and top. The viscous liquid and semisolid fire protective means described above may require more than a single application in order to achieve such increased protection at the base of the article to be protected. Furthermore it is difficult to apply such prior art fire protective materials in order to provide a uniformly increased thickness of the article base.

It is an object of this invention to provide an improved fire protective insulating device. Other objectives will become apparent upon a reading of the entire specification including the drawings and claims.

SUMMARY OF THE INVENTION

The present invention comprises a fire protective insulating device having at least one layer of resilient and compressible and preferably non-combustible insulating material which is compressed by a plurality of fastener means so as to increase the density of the insulating means. A scrim means for retaining the compressed insulative material is wrapped about the exterior of the compressed insulative material. At least a portion of the fastener means is constructed of a material which is substantially less resistive to high temperature than is the insulative material. In one preferred form, the insulating device is preformed in a generally box-like or boot configuration, one surface of the device being adapted to be opened in order to be positioned about a motor or other object to be protected from fire, said surface then being sealed in order to isolate the object to be protected from fire.

DESCRIPTION OF PREFERRED EMBODIMENTS

Figure 1:
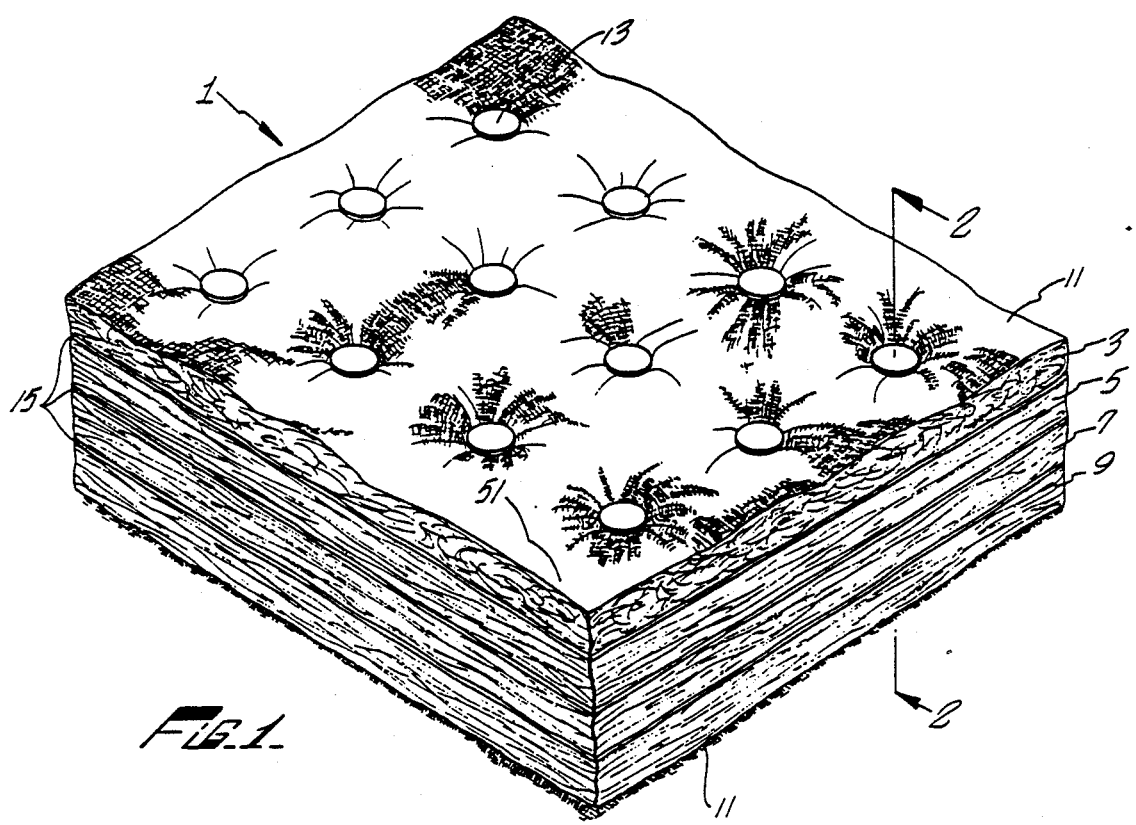
FIG. 1 is a partial cross-sectional view of the present invention.
Figure 2:
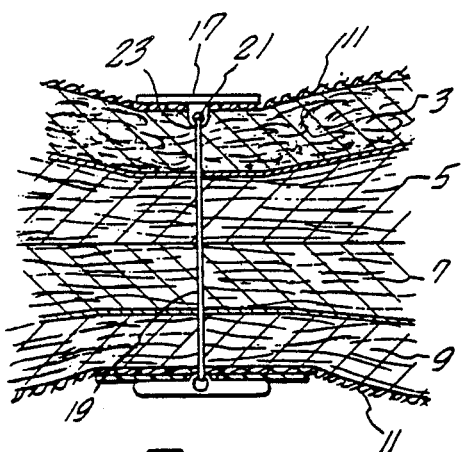
FIGS. 2, 3 and 4 are cross-sectional views illustrating the present invention.
Figure 3:
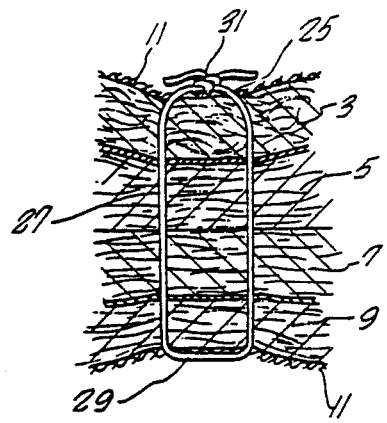
Figure 4:
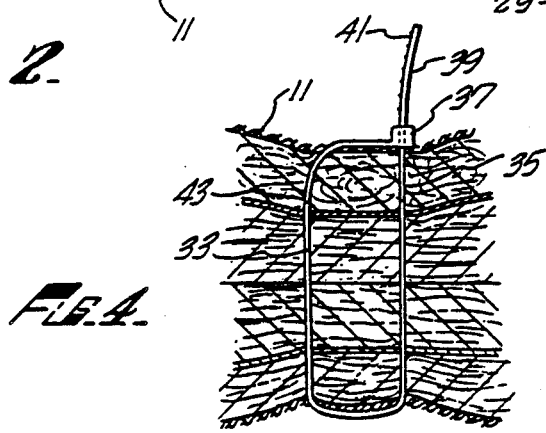

Referring now to FIG. 1, a fire protective insulating device generally referred to as 1, is illustrated. The fire protective device 1 includes at least a single layer, such as layer 3, of resilient and compressible and preferably non-combustible insulating material which is compressed by a plurality of compressive fastener means generally referred to as 13. FIGS. 2, 3 and 4 illustrate typical fastener type means and will be discussed in greater detail later. A scrim means 11 is placed on the outside of the insulative material 3, the scrim means 11 allowing for the maintenance of the insulative material 3 in the compressed state. Furthermore, the scrim means 11 allows the insulative material 3 to be more easily handled. At least a portion of the fasteners 13 is constructed of a material which is substantially less resistant to high temperature than is the insulative material 3. The scrim means 11 is preferably also constructed of such a low temperature resistive material, but alternatively may be constructed of a material which is expanded by the expansion of the insulative material 3.

In a preferred embodiment, as illustrated in FIG. 1, a plurality off layers of insulative material such as layers 3, 5, 7 and 9 are utilized, the layers being constructed of an inorganic fiber blanket, organic fiber blanket, organic foam or a ceramic fiber. Further, layers of aluminum foil 15 may be placed between the layers of insulative material 3, 5, 7 and 9.

In another embodiment, the insulative material 3 is further defined as being constructed of an aluminum silicate ceramic fiber while layers 5, 7 and 9 are layers of glass fiber having a polymeric binder, preferably a plastic such as a phenolic, which assists in restoring the insulative material 3 to its original density. The scrim means 11 is preferably made from a nylon, glass fiber, polyester or Nomex material or a flexible wire mesh. Nomex is a E. I. Du Pont de Nemours & Co. trademarked product, an aromatic polyamide having high temperature resistive properties. Further, the exterior of the fire protective device 1 may be coated with a reflective means 51 such as aluminum or silver in order to reflect radiant heat and/or an exterior weather protective cover. The fastener means 13 and the scrim means 11 may be formed of a material which is substantially less resistive to high temperature than is the insulated material 3. Thus when the fire protective insulating device is subjected to high temperature, both the fastener means 13 and the scrim means 11 are damaged as to their structural integrity such that the insulative means such as 3 is allowed to expand. The density in the compressed state for the insulative material is normally within a range of about two (2) pounds per cubic foot and about twenty four (24) pounds per cubic foot and the insulative material expanded density is within the range of about one (1) pound per cubic foot and about twelve (12) pounds per cubic foot.

Figure 5:
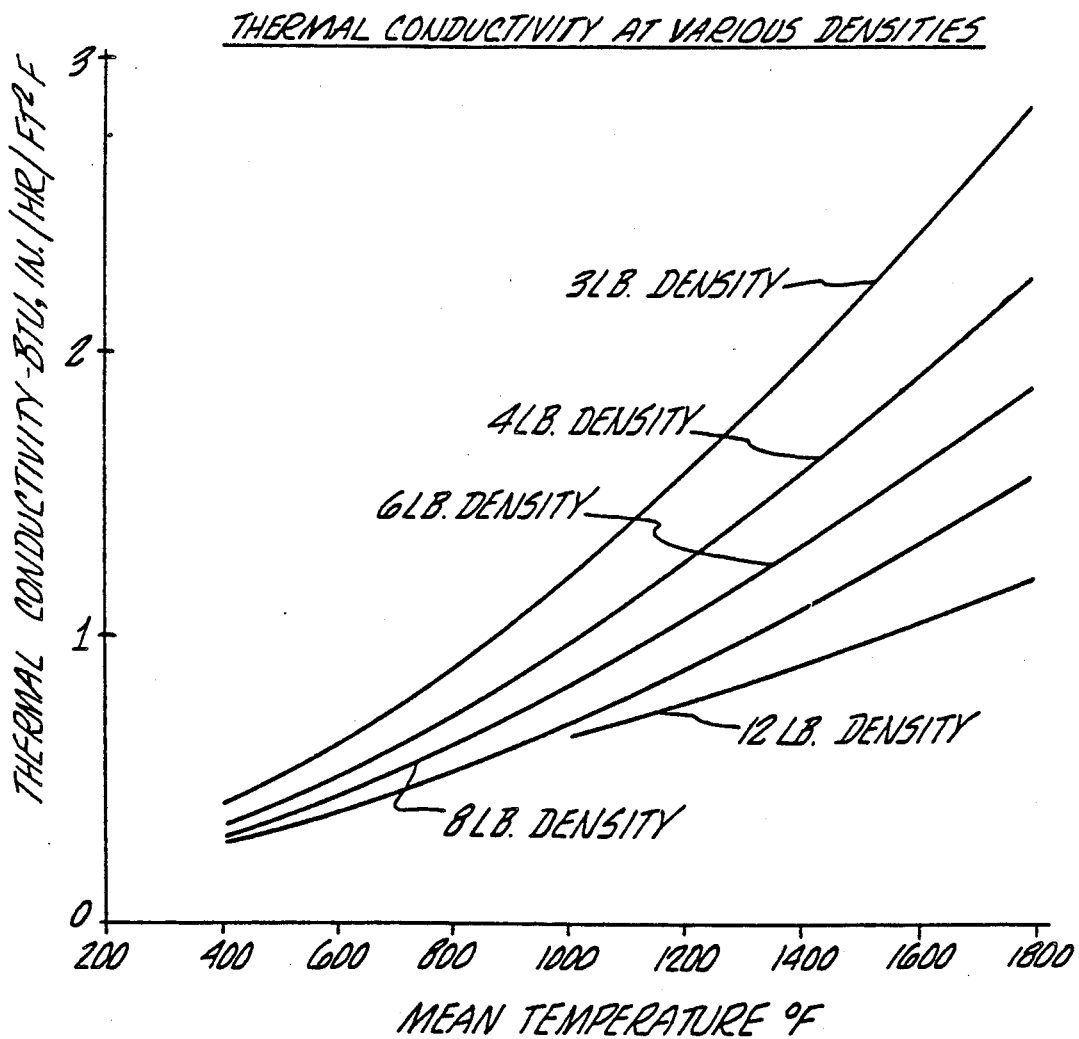
FIG. 5 is a graph illustrating thermal conductivity as a function of insulative density and temperature.

FIG. 5 illustrates the relationship between thermal conductivity and temperature as a function of insulative density. In accordance with the present invention, the advantages of an increased thickness of insulation is only utilized at a fire condition and in the normal mode the fire protection device is a much more compact structure.

FIGS. 2, 3 and 4 illustrate typical fastener means 13 for compressing the insulative material. Referring to FIG. 2, plates or buttons 17 having an eyelet member 21 through which a strand 22 may be strung is illustrated. The strand is run through the insulative layers 3, 5, 7 and 9 through a hole 23 pierced through the insulative layers. FIG. 3 illustrates a second type of compressive fastener means wherein a cord 25 is passed through the insulative layers by means of two holes 29 and 27 prior to being tied off at 31. Lastly, FIG. 4 illustrates a fastening means 13 wherein a strand 43 passes through the insulative layers through apertures 33 and 35, the end 41 of strand 43 passing through latch mechanism 37. Strand 41 has a plurality of locking members 39 which engage latch mechanism 37 in order to firmly secure the insulative layers in the compressed configuration. Rather than the entire fastening means 13 being fabricated of a material being substantially less resistive to high temperature as compared to the insulative material 3, only a portion of the fastening means 13, such as strand 22 or cord 25 may be constructed of such low high temperature resistive material.

While each of the FIGS. 1 through 4 illustrate a fire protective insulating device 1 having a plurality of insulative layers, it is understood that the present invention might be practiced wherein a single layer of insulative material is utilized.

EXAMPLE

An insulative material of 4 inches thickness and having a density of 3 pounds per cubic foot and a thermal conductivity of about 1.1 BTU/in/hr/ft$^2$°F. at a temperature of about 1000° F. is compressed to a one inch thickness having a density of about 12 pounds per cubic foot and a thermal conductivity of about 0.65 BTU/hr/ft$^2$°F. at 1000° F. Upon re-expanding during a high temperature situation to its 4 inch thickness, the insulative material has a total thermal conductivity of about 0.275 BTU/hr/ft$^2$°F. due to its four inch thickness. Such a device thus provides the advantages of improved handling and reduced size under normal circumstances with the advantages of excellent insulative protection during a fire.

Figure 6:
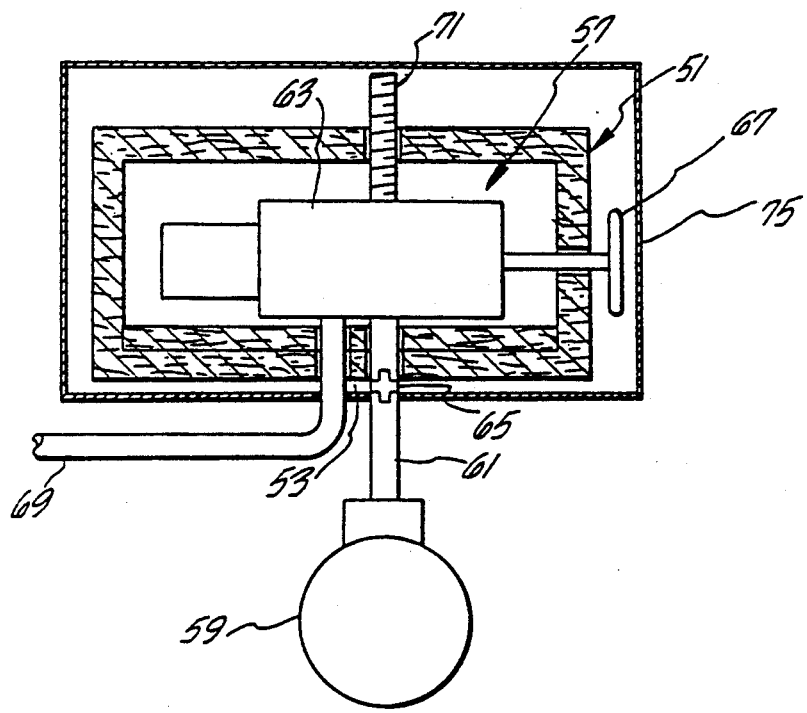
FIGS. 6, 8 and 9 are partial cross-sectional views of embodiments of the present invention.
Figure 7:
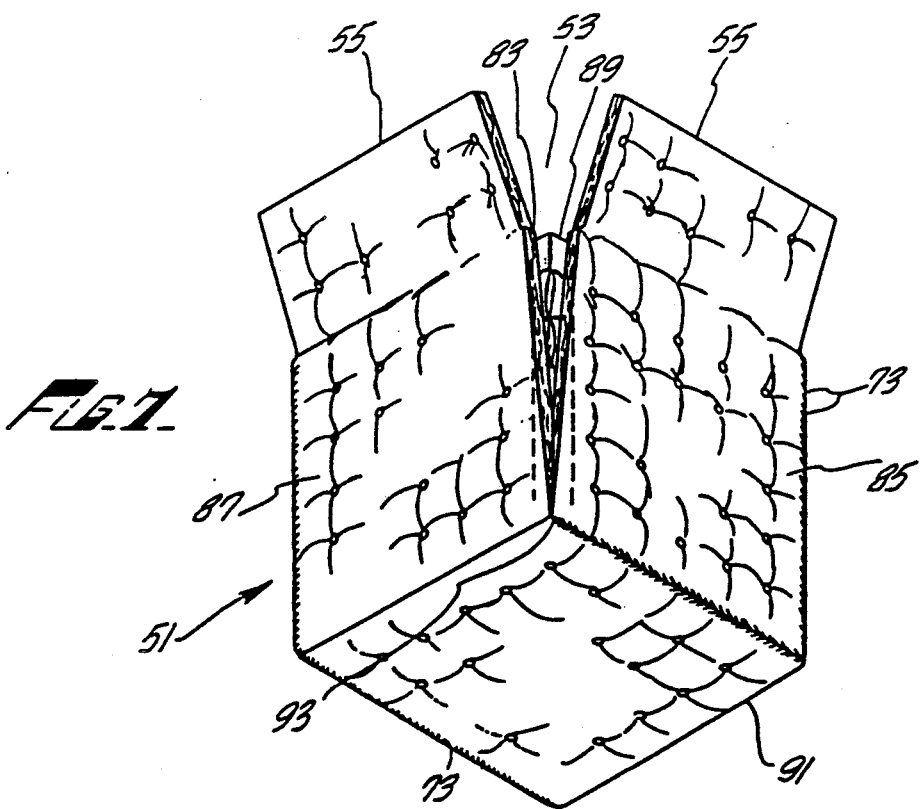
FIG. 7 is a pictorial view of the embodiment of FIG. 6.

Referring now to FIGS. 6 and 7, one preferred configuration of the fire protective insulating device of this invention will be described in detail. A fire protective device referred to generally as 51 is shown in FIGS. 6 and 7 to be of a generally box-like configuration. The fire protective device 51 includes a surface 53 of the resilient compressible material previously described which is provided with a plurality of flap or sealing members 55 which may be opened in order to position the cubical fire protective device 51 about an electrical motor operator 63, including a motor 57 or other object to be protected from fire and then folded into a sealing position illustrated in FIG. 6 in order to isolate the electrical motor operator 63 from potential fire damage. As each of the flaps 55 is about one-half the length of the box sides such as 85 and 87, when folded into a sealing position they provide a double thickness of insulation at the base of the electrical motor operator 63.

Referring now to FIG. 6, a valve 59 is shown having a valve stem 61 which when actuated opens and closes the valve 59 in order to allow fluid passage through the valve. The electrical motor operator 63, including the electrical motor 57, is connected to said valve stem 61 by yoke means 65. The motor operator 63 may be provided with a manual wheel 67 which may be utilized to mechanically operate the valve stem 61 in order to open and close the valve 59. Electrical power may be provided for the operation of the electrical motor operator 63 by means of an electrical conduit 69. The electrical conduit 69 is preferably wrapped or coated with a fire retardant product as described in my copending U.S. patent application Ser. No. 687,345 filed May 19, 1976, titled "Fire Retardant Product for Use with Electrical Cables and the Like" which is a continuation-in-part of my U.S. patent application Ser. No. 400,054 filed Sep. 24, 1973, hereby incorporated by reference. In operation, the electrical motor operator 63 may be actuated from a remote location causing the electrical motor operator gearing 71 to rotate, thereby opening or closing the valve 59 by turning the yoke means 65 and valve stem 61.

The fire protective insulating device 51 of generally box-like configuration may be provided with apertures to accommodate the manual operation wheel 67 and the threaded stem 71 of the electrical motor operator 63. If the motor operator gearing 71 extends through such an aperture as shown in FIG. 6, it may be protected by a tubular member of the material from which the fire protective insulating device 51 is constructed. The seams 73 of the cubical fire protective device are preferably sewn with stainless steel wire 91 which is coated with a plasticized polyvinyl chloride in order to prevent cutting or otherwise damaging the exterior surface of the fire protective insulating device 51. Further, when the flaps 55 of surface 53 of the fire protective device 65 are positioned so as to seal the electrical motor operator, the flaps 55 are sewn or wrapped with such coated stainless steel wire 91. In a further preferred embodiment, the fire protective insulating device is covered in a weather protective sheet 75, such as a Dacron scrim coated with a plasticized polyvinyl chloride. Dacron is a polyester fiber made from polyethylene terephthalate trademarked by E. I. Du Pont de Nemours & Co.

The fire protective insulating device 51 is of generally box-like configuration and may be provided with a slit 83 along one seam, as shown in FIG. 7 between side wall members 85 and 87. This slit 83 allows the fire protective insulating device 51 to be more easily positioned about an article to be protected. A tongue member 89 positioned along the length of the slit 83 may be fastened at its base 93 to the fire protective insulating device 51. Following the positioning of the fire protective insulating device about a device to be protected such as an electrical motor operator 63, the slit 83 may be stitched closed by means of coated stainless steel wire 91.

Figure 8:
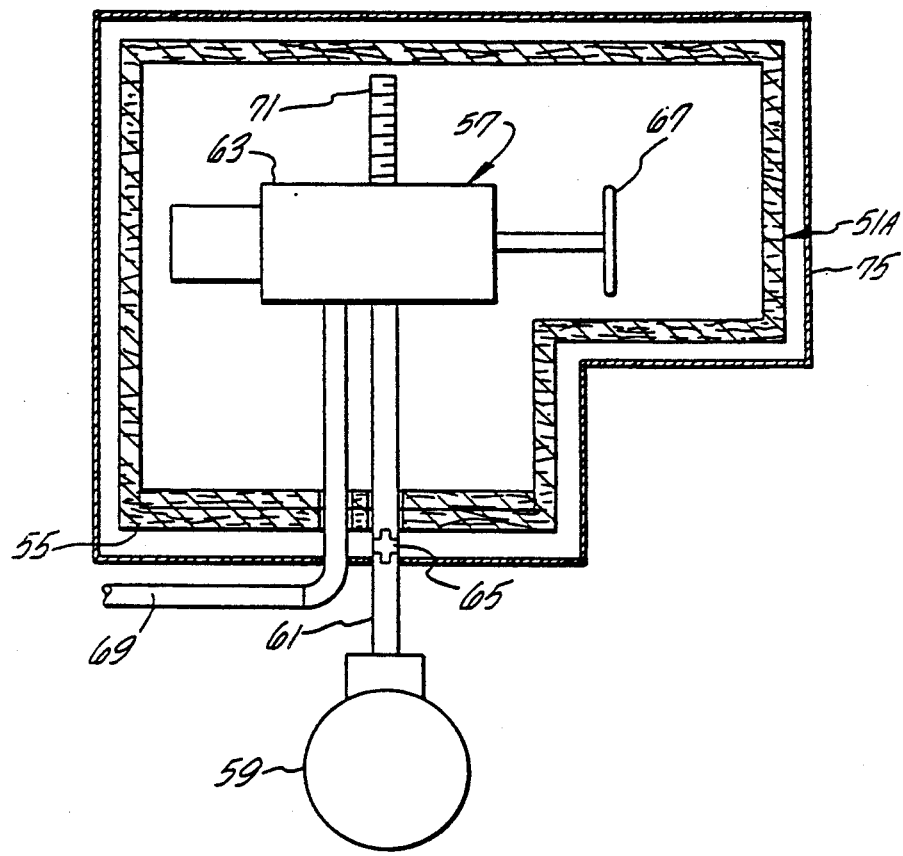

Referring now to FIG. 8, a fire protective insulating device in the shape of a sock or boot 51A is shown placed about the electrical motor operator 63. The boot 51A may also be provided with four overlapping flaps 55 at its base in order to yield increased fire protection in that area. Further, such a boot configuration may also be surrounded by a weather protective sheet 75.

Figure 9:
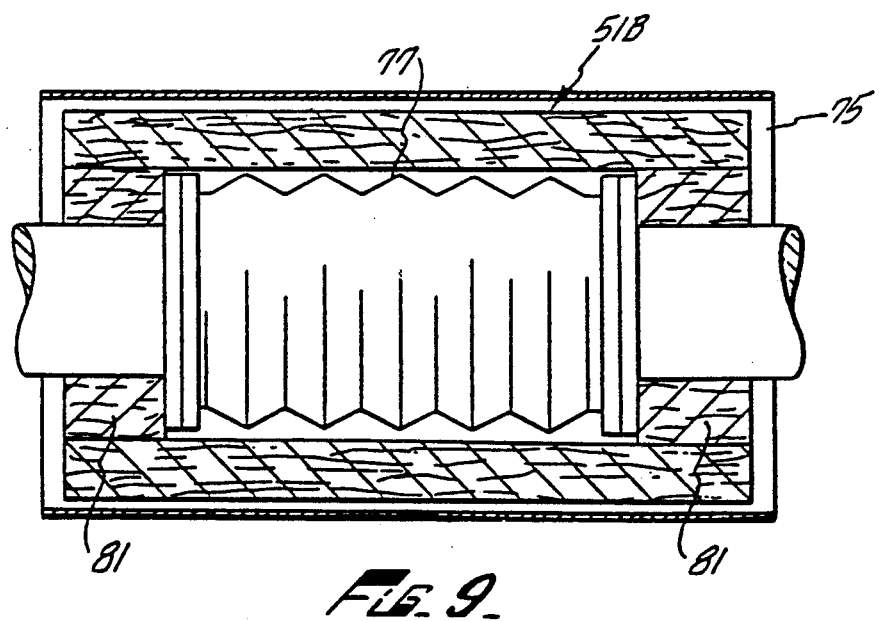

An alternate embodiment is shown in FIG. 9 wherein a bellows type expansion joint 77 positioned between connective members 79 is protected by means of a further embodiment of the fire protective insulating device labeled 51B in FIG. 9. Such a bellow type expansion joint 77 is typically employed in piping configurations in oil refineries and chemical plants and the like in order to allow for thermal expansions and contractions in the pipe lengths by contraction and expansion of the bellows portion of the bellows expansion joint 77. The fire protective insulative device 51B of FIG. 9 is preformed in sections which are mounted about the bellows type expansion joint 77 and suitably sealed as by means of stainless steel wire.

Having described the invention, it will be apparent to those skilled in the art that additional forms thereof, such as additional configurations of the fire protective insulative device, may be employed. It is accordingly my intent to be limited only by the scope of the appended claims.

What is claimed is:

1. A fire protective insulating device of a generally boxlike configuration, having one end adapted to be placed about an electrical motor to be protected from a fire and including panel members connected together by non-flammable means which enclose said device around said motor to retain said device's enclosing function during a fire in order to isolate said motor from fire damage, and said fire protective insulating device being further defined as including:

a plurality of layers of resilient and compressible non-combustible insulative material, said insulative material mechanically compressed to a density between about two and about twenty-four pounds per cubic foot by a plurality of compressive fastener means positioned through said insulative material, and constructed of a material which is substantially less resistant to high temperature than is said insulative material, said insulative material being capable of mechanical expansion to a density of about one to about twelve pounds per cubic foot, having at least one outer layer formed from a ceramic fiber and at least one inner layer formed from a glass fiber blanket, and constituting the surface of said insulating device to be adjacent to the exterior surface of the electrical motor when placed thereabout;

scrim means about the exterior of the compressed insulative material further mechanically compressing said insulative material, said scrim means also being constructed of material which is substantially less resistant to high temperature than is said insulative material, whereby when said fire protective insulating device is subjected to a fire the structural integrity of said fastener means and said scrim means is decreased, thereby allowing the insulative material to expand mechanically to a density of about one to about twelve pounds per cubic foot; and closure members included in said end of said generally boxlike configured fire protective insulating device which substantially overlap upon closure and are stitched with non-flammable stitching means to maintain the enclosing function of said device during a fire, whereby said closure members provide double thickness of insulation about one surface of the motor to be protected from fire when said insulative device is sealed about said motor.

2. The fire protective insulating device of claim 1 wherein said device includes a weather-proofing material about the exterior thereof.

3. The fire protective insulating device of claim 1 wherein aluminum foil is positioned between said insulative material layers.

4. The fire protective insulating device of claim 1 wherein said scrim means is constructed of a material selected from the group consisting of nylon, glass fiber and polyester.

5. The fire protective insulating device of claim 1 wherein said end of said generally box-like configuration of said device is further defined as comprising four flap members which overlap when said and is closed in order to isolate said motor.

6. The fire protective insulating device according to claim 1 wherein said closure members at the end of said box-like configured fire protective device are wrapped with non-flammable means to maintain the enclosing function of said device during a fire.

* * * * *